(12) United States Patent
Crawford et al.

(10) Patent No.: US 11,008,089 B2
(45) Date of Patent: May 18, 2021

(54) FIREPROOF PRESSURE RELIEF ASSEMBLY

(71) Applicant: Gulfstream Aerospace Corporation

(72) Inventors: Darwin Dean Crawford, Skiatook, OK (US); Clifford Frank Shaeffer, Owasso, OK (US); Jerod Kennon Matlock, Owasso, OK (US)

(73) Assignee: Gulfstream Aerospace Corporation, Savannah, GA (US)

( * ) Notice: Subject to any disclaimer, the term of this patent is extended or adjusted under 35 U.S.C. 154(b) by 268 days.

(21) Appl. No.: 16/169,146

(22) Filed: Oct. 24, 2018

(65) Prior Publication Data

US 2020/0130811 A1 Apr. 30, 2020

(51) Int. Cl.
| | | |
|---|---|---|
| *B64C 7/02* | (2006.01) | |
| *B64D 29/06* | (2006.01) | |
| *B64D 29/08* | (2006.01) | |
| *F02C 7/12* | (2006.01) | |
| *F02K 3/075* | (2006.01) | |

(52) U.S. Cl.
CPC ............... *B64C 7/02* (2013.01); *B64D 29/06* (2013.01); *B64D 29/08* (2013.01); *F02C 7/12* (2013.01); *F02K 3/075* (2013.01); *F05D 2260/30* (2013.01)

(58) Field of Classification Search
CPC .......... B64C 7/02; B64D 29/00; B64D 29/06; B64D 29/08; B64D 2045/009; F02C 7/12; F02C 7/25; F02K 3/075; F05D 2260/30; Y02T 50/60; E05B 65/102; F01D 21/14; F01D 25/24
See application file for complete search history.

(56) References Cited

U.S. PATENT DOCUMENTS

| | | |
|---|---|---|
| 3,571,977 A | 3/1971 | Abeel |
| 3,934,889 A | 1/1976 | Smith |
| 4,033,247 A | 7/1977 | Murphy |
| 4,232,513 A | 11/1980 | Pearson et al. |
| RE32,554 E | 12/1987 | Murphy |
| 4,825,644 A | 5/1989 | Bubello et al. |

(Continued)

FOREIGN PATENT DOCUMENTS

GB 767094 A 1/1957

OTHER PUBLICATIONS

Thermal Structures, Inc. "Fire Barrier Systems," 2009, 7-pages, WWW.ThermalStructures.com, Corona, CA, USA.

(Continued)

*Primary Examiner* — Valentina Xavier
(74) *Attorney, Agent, or Firm* — LKGlobal | Lorenz & Kopf, LLP

(57) ABSTRACT

A pressure relief assembly (24) includes an aircraft engine cowl (26) having radially outer and inner skins (28,30) having an opening. A door frame (32) is joined around the perimeter of the opening and defines a door seat (34) surrounding a central portal (36). A pressure relief door (38) is joined to the cowl (26) to cover the portal (36). The door (38) has inner and outer surfaces (40,42) terminating in a perimeter rim (44), with the inner surface (40) of the rim (44) overlapping the door seat (34) to define a primary seal (46) with the door stowed closed. A fireproof secondary seal (48) bridges the door inner surface (40) and frame (32) around the inner perimeter of the primary seal (46) to pre-seal flow to the primary seal (46).

20 Claims, 12 Drawing Sheets

(56) References Cited

U.S. PATENT DOCUMENTS

| | | | |
|---|---|---|---|
| 5,036,632 A | 8/1991 | Short et al. | |
| 5,091,605 A | 2/1992 | Clifford | |
| 5,156,360 A | 10/1992 | Shine | |
| 5,251,917 A | 10/1993 | Chee et al. | |
| 5,623,820 A | 4/1997 | Balzer et al. | |
| 5,765,883 A | 6/1998 | Dessenberger et al. | |
| 5,910,094 A * | 6/1999 | Kraft | F02C 7/25 60/39.091 |
| 5,967,170 A | 10/1999 | Hume et al. | |
| 6,029,933 A * | 2/2000 | Holman | B64C 1/10 244/118.5 |
| 6,131,352 A | 10/2000 | Barnes et al. | |
| 7,628,167 B2 | 12/2009 | Eijkelenberg et al. | |
| 7,950,408 B2 | 5/2011 | Farwell et al. | |
| 8,240,604 B2 * | 8/2012 | Opp | B64C 1/18 244/118.5 |
| 8,439,308 B2 | 5/2013 | Armstrong et al. | |
| 9,835,090 B2 | 12/2017 | Exner | |
| 9,845,733 B2 | 12/2017 | Brice | |
| 10,399,660 B2 * | 9/2019 | Brown | B64C 1/066 |
| 10,571,025 B2 * | 2/2020 | Takeuchi | B64D 41/00 |
| 10,690,058 B2 * | 6/2020 | Takeuchi | B64C 7/00 |
| 2011/0240137 A1 | 10/2011 | Vauchel | |
| 2018/0142624 A1 | 5/2018 | Song | |
| 2018/0156129 A1 | 6/2018 | Takeuchi | |
| 2018/0163631 A1 * | 6/2018 | Takeuchi | B64D 29/06 |
| 2018/0283280 A1 * | 10/2018 | Cassagne | F02C 7/20 |

OTHER PUBLICATIONS

Akrofire, "Akro Specialized High Temperature Insulation Products," Oct. 22, 2018, 1-page Product Description, WWW.Akrofire.com, Lenexa, KS, USA.

Lewco Speciality Products, Inc., "High Temperature Insulation Textiles & Accessories for Industry," Oct. 22, 2018, 6-page Brochure, WWW.LewcoSpecialtyProducts.com, Baton Rouge, LA.

Darshan Safety Zone, "Jay Shree SwamiNarayan," Aug. 7, 2018 23-page material descriptions, WWW.DarshanSafetyZone.com, Gujarat, India.

Darco Southern Inc.,"High Temperature Cloths," Aug. 7, 2018, 6-page product descriptions, WWW.DarcoSouthern.com, Independence, VA, USA.

* cited by examiner

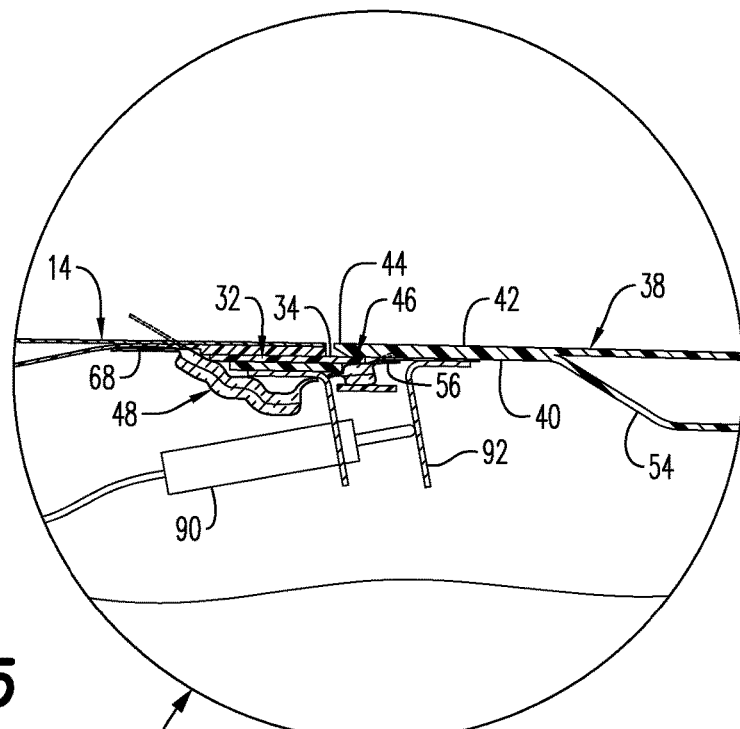
FIG. 5
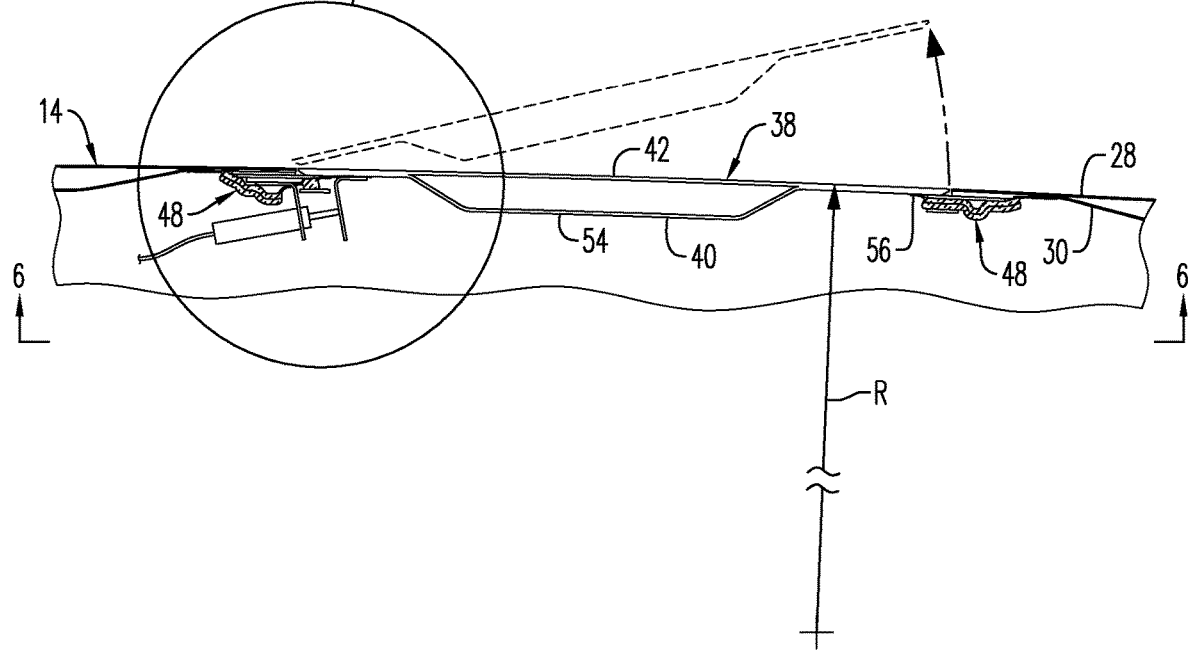

FIREPROOF PRESSURE RELIEF ASSEMBLY

BACKGROUND OF THE INVENTION

The present invention relates generally to aircraft engines, and more specifically to pressure relief doors in the nacelles thereof.

An aircraft engine is mounted to an aircraft inside an aerodynamically smooth nacelle. The typical turbofan gas turbine engine includes a front-mounted fan generating propulsion thrust channeled aft through an annular bypass duct surrounding the core engine.

The Federal Aviation Administration (FAA) of the United States certifies aircraft for flight, and promulgates various regulations and rules, including those related to engine fires during operation or flight.

The typical aircraft includes fire control features designed to meet FAA regulations for detecting, controlling, and automatically extinguishing fires by specialized designs. Further regulations define fire zones for the engine, and require suitable fireproofing therein.

For example, 14 CFR 25.1193 regulates fireproofing for the nacelles and cowls surrounding the engine, with different fireproof requirements for different features. Fireproof skins are required in areas subject to fire or flames, and suitable provisions must be provided so that no fire originating in any fire zone can enter, either through openings or by burning through external skin, any other zone or region where it would create additional hazards.

The engine nacelle typically includes a pressure relief door (PRD) which is sealed closed during normal engine operation, but is designed to open when excess pressure builds inside the nacelle, for example, from a failure of the pneumatic or bleed air systems of the engine.

Pressure relief doors are commercially available in various configurations, and typically include a perimeter rim with a flat inner surface which mates with the flat outer surface seat of the door land or frame surrounding the vent portal through the nacelle. The door rim simply overlaps the frame seat to effect a tight contact lap-joint seal therewith.

Excess pressure, for example 3 to 5 p.s.i.g., will exert a pressure load across the exposed inside surface area of the PRD which will force open the PRD to vent the excess pressure. The PRD is hinged for movement between stowed and deployed positions, and a pressure relief latch normally locks closed the PRD.

The PRD latch typically includes a spring that biases closed a latch hook that locks closed the PRD on its frame mating seat. Excess pressure loads exerted on the PRD allow the latch hook to release at a predetermined release load to avoid premature deployment of the PRD, while ensuring suitable venting of the nacelle when required. The release load can have very small or precise tolerances due to the simple lap-joint seal between the PRD rim and its mating frame seat.

Recent studies for a new aircraft under development have shown that exposure of the PRD to fire can cause thermal distortions of the PRD, including distortion of the lap-joint door seal resulting in small gaps therein distributed around the circumference thereof. These small gaps will vent flow from the nacelle, and might affect overall ventilation flow pattern inside the nacelle and the distribution of fire extinguishing agents.

The PRD is provided in an aircraft engine nacelle for the sole purpose of automatically venting excess internal pressure when required during engine operation, especially during aircraft flight, to prevent undesired pressure damage. In the unlikely event of engine fire, normal operation of the PRD must still be retained to allow automatic venting at the desired release load.

Since the pressure relief doors are closed during normal engine operation, no flow is vented, and no additional fire control features therefor have been required in the past. In this regard, the FAA has issued Equivalent Level Of Safety (ELOS) memos for exemplary PRD designs allowing use thereof in commercial service.

However, in the continuing development of the new aircraft mentioned above, it is desired to provide additional fire control features for the otherwise conventional PRD design being developed, without adversely affecting normal operation of the PRD, including the fundamental requirement for maintaining the small tolerance on the predetermined release load in the latching of the door.

In the event of fire, additional fire protection is desired to reduce thermal distortion and damage to the PRD and prevent or minimize fire venting through the stowed PRD while still retaining PRD relief functionality in the further event of excess pressure operation.

One fire protection feature considered during development efforts was the introduction of a conventional fireproof rope seal between the PRD rim and its mating door seat. Such a rope seal requires compression to fill the gap between the rim and seat and might be effective in accommodating some thermal distortion during a fire.

However, compression of the rope seal requires additional compressive forces which could vary significantly depending on minor variations in actual compression distance applied thereto. Such variable compressive forces in turn affect the actual release loads reacted through the pressure relief latch.

Since the latch is designed to a small variation release load, it might therefore release prematurely before a suitable excess pressure is exerted on the PRD, or might release late after the desired excess pressure is applied to the PRD. Early opening would lead to unnecessary maintenance actions, while excess pressure would be unacceptable during an aircraft engine bleed failure event.

Accordingly, it is desired to provide an improved pressure relief door assembly maintaining original performance of the release latch, while introducing additional fireproofing features.

BRIEF DESCRIPTION OF THE INVENTION

A pressure relief assembly includes an aircraft engine cowl having radially outer and inner skins having an opening. A door frame is joined around the perimeter of the opening and defines a door seat surrounding a central portal. A pressure relief door is joined to the cowl to cover the portal. The door has inner and outer surfaces terminating in a perimeter rim, with the inner surface of the rim overlapping the door seat to define a primary seal with the door stowed closed. A fireproof secondary seal bridges the door inner surface and frame around the inner perimeter of the primary seal to pre-seal flow to the primary seal.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 5 is an exploded sectional view of the PRD shown in FIG. 1 and taken along line 5-5 near the circumferential center thereof.

DETAILED DESCRIPTION OF THE INVENTION

Figure 1:
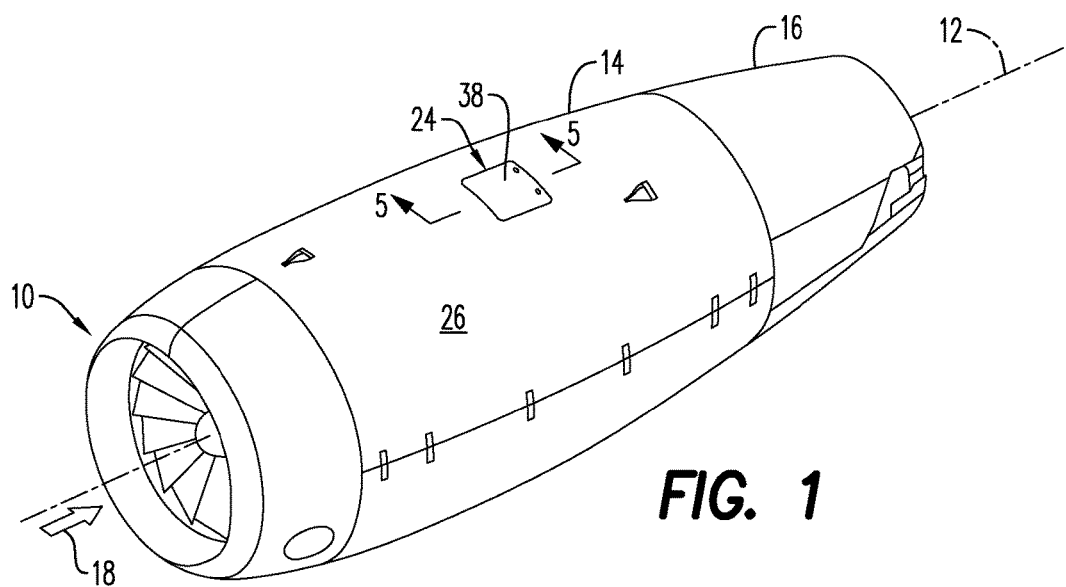
FIG. 1 is an isometric view of an exemplary aircraft engine and nacelle for powering an aircraft in flight, and including a top mounted pressure relief door (PRD) shown stowed closed in the nacelle.

Illustrated in FIG. 1 is a turbofan gas turbine engine 10 having an axial or longitudinal centerline axis 12. The engine is covered by an annular nacelle 14 and terminates in a thrust reverser 16. This exemplary engine is configured for powering an aircraft (not shown) in flight as the port, or left-hand engine thereof.

Figure 2:
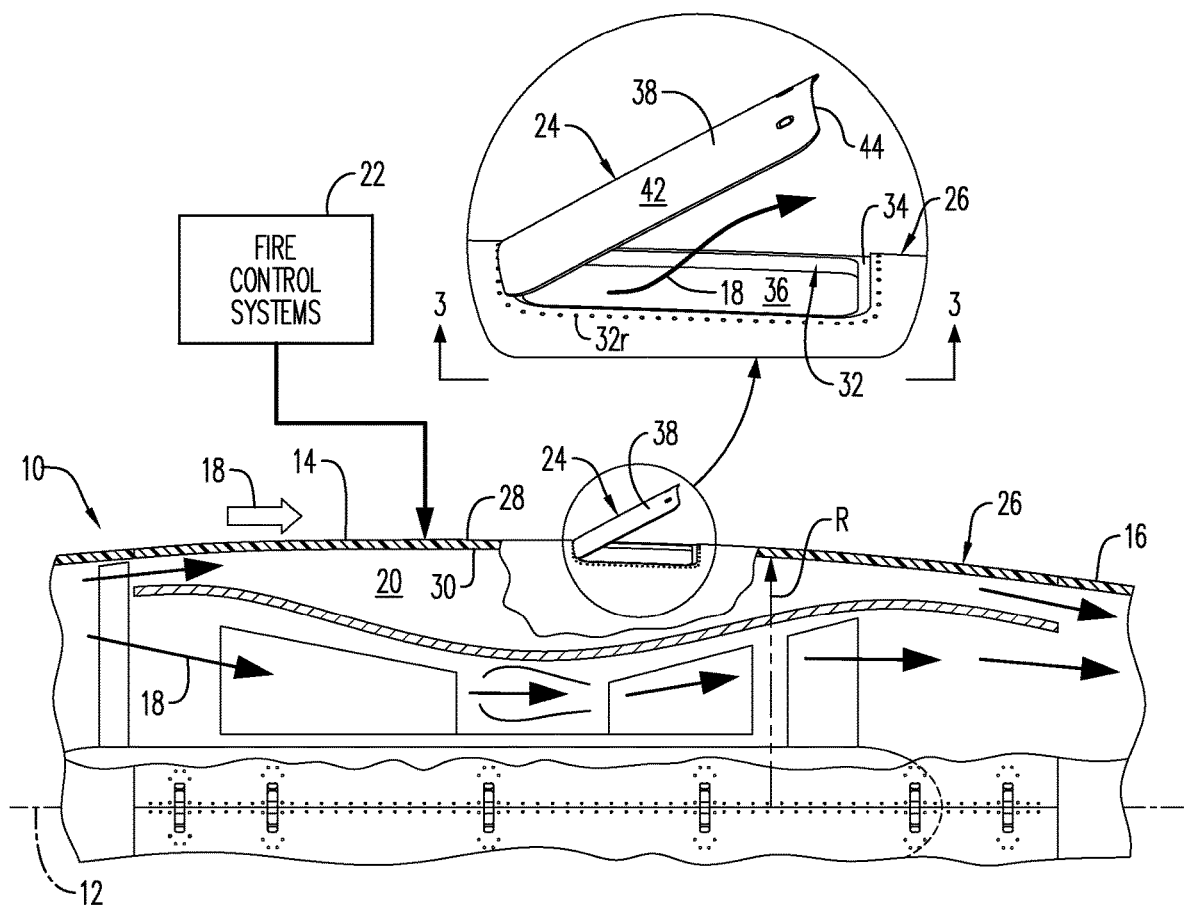
FIG. 2 is a schematic side elevational view of the aircraft engine shown in FIG. 1 with the PRD shown deployed open in the nacelle.

FIG. 2 illustrates the engine 10 schematically in a conventional configuration having in serial flow a fan at the forward end, compressor, combustor, high pressure turbine driving the compressor, and a low pressure turbine driving the fan, followed at the aft end by the thrust reverser 16 (shown in part).

In operation, ambient air 18 is compressed by the fan and compressor, burned with fuel in the combustor and discharged as hot exhaust gases through the two turbines and thrust reverser.

An annular bypass duct 20 channels the outer portion of fan air around the core engine for discharge with the combustion gases through the thrust reverser. The nacelle 14 may have various partitions to define various fire zones along the bypass duct 20, and the engine 10 may include conventional fire control systems 22 in accordance with applicable FAA regulations.

As indicated above, the nacelle 14 includes a pressure relief system or assembly 24 specially modified as presented below for bleeding or venting excess internal pressure when required during engine operation and aircraft flight.

The nacelle includes an upper cowling or cowl 26, along with a complementary lower cowl, which are both hinged on the inboard or aircraft side of the nacelle to open in clamshell fashion from the outboard side of the nacelle in conventional fashion. The pressure relief assembly 24 is specially integrated in the upper cowl 26 to face outboard and away from the aircraft in accordance with FAA fire requirements.

Figure 3:
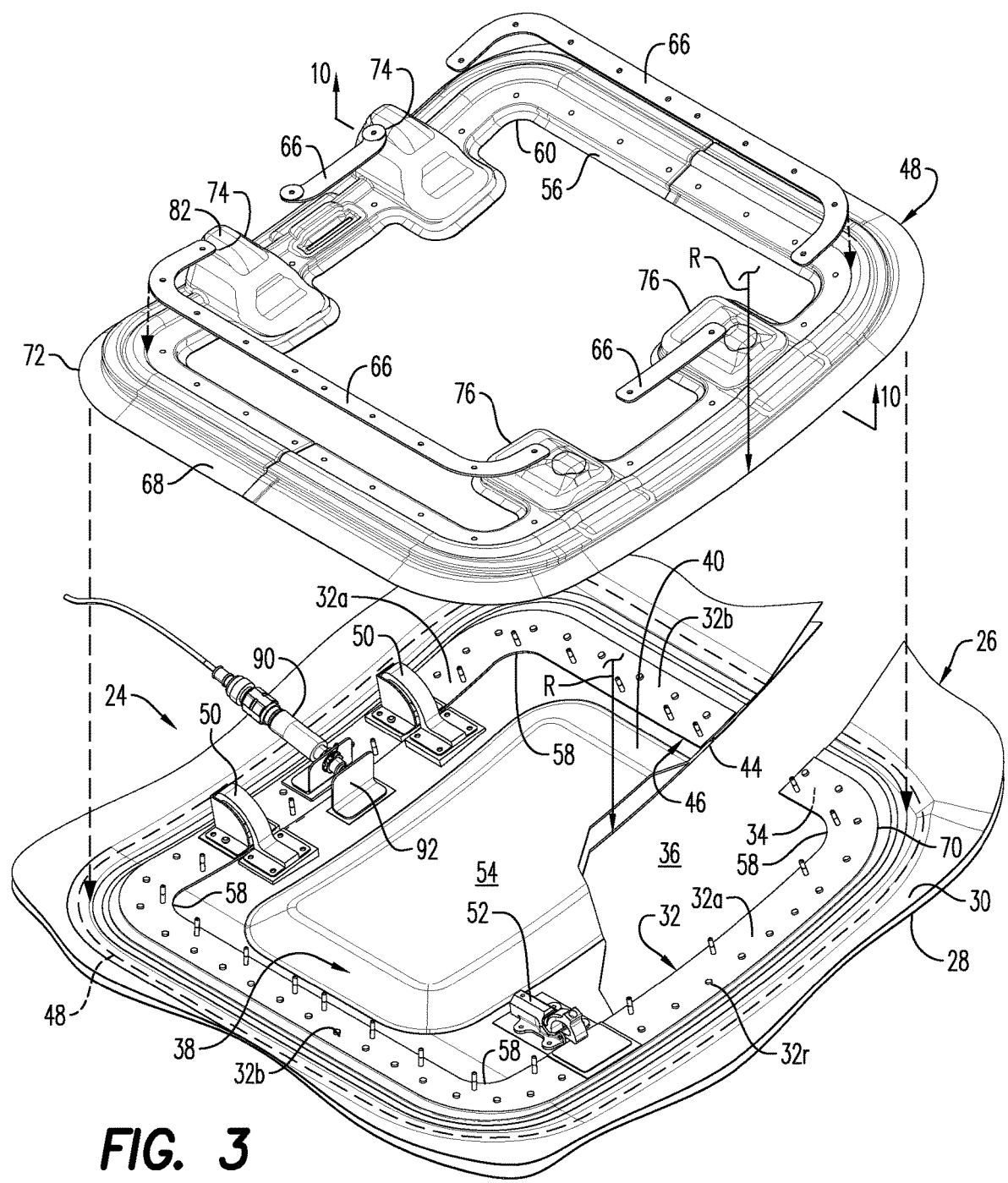
FIG. 3 is an underside isometric view of the PRD shown in FIG. 2 and taken along line 3-3, and shows a rectangular fireproof secondary seal exploded in isolation from the underlying PRD mounted in the upper cowl of the nacelle.
Figure 4:
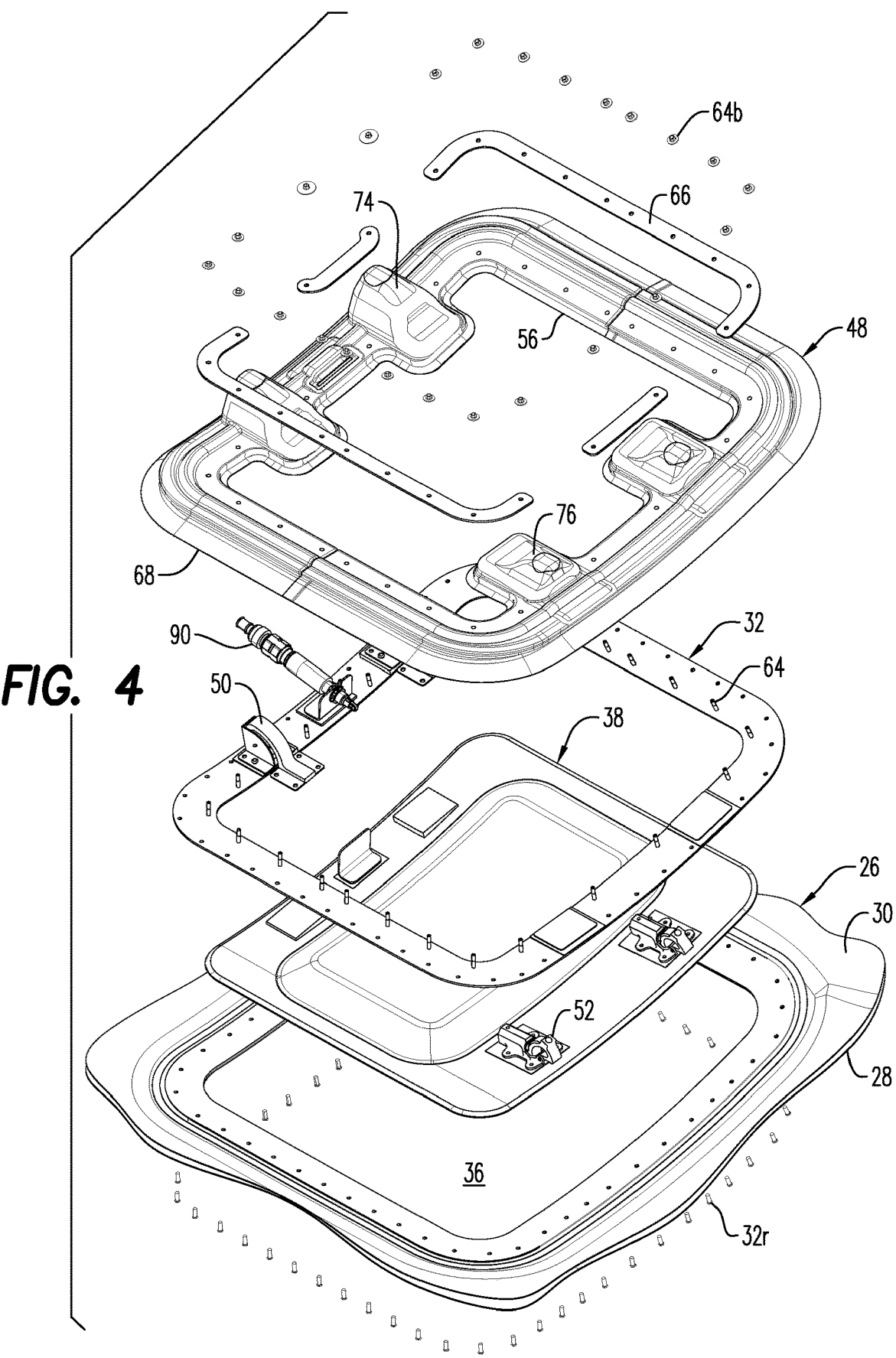
FIG. 4 is an exploded isometric view of the PRD and secondary fireproof seal shown in FIG. 3.

FIGS. 3 and 4 show in exploded view the pressure relief assembly 24 mounted to the inside of the upper cowl 26. The cowl 26 includes radially outer and inner skins 28,30 having an opening extending radially therethrough.

A generally rectangular door frame 32 is fixedly joined, by flush-headed rivets 32r for example, around the perimeter of the opening and extends laterally inwardly therefrom to define a generally rectangular frame or door seat 34 surrounding a central portal 36 which defines a vent opening through the nacelle. The frame 32 is thin and narrow to define a plain, generally flat door land or seat 34 which faces radially outwardly in a small step adjoining the cowl outer skin 28.

A pressure relief door (PRD) 38 is pivotally joined to the cowl 26 for being deployed radially outwardly from a stowed closed position covering and sealing closed the portal 36 to a deployed open position inclined radially outwardly to uncover the portal 36 to vent excess-pressure airflow 18 when required during engine operation.

As shown in FIG. 5, the door 38 has radially opposite inner and outer surfaces 40,42 terminating in a perimeter rim 44, with the inner surface 40 of the rim 44 overlapping the door seat 34 to define a primary seal 46 in the door stowed position. When stowed, the door rim 44 is held in direct contact with the door seat 34 to define a lap joint friction primary seal 46 around the full circumference of the door 38 and supporting frame 32.

As shown in FIGS. 2, 3, and 4, the exemplary door 38 is generally rectangular in configuration, and its rim 44 follows the full perimeter thereof. The door seat 34 is similarly rectangular in configuration and complements the door rim 44 to effect a full-perimeter lap-joint contact primary seal 46 therebetween in a conventional manner.

Pressure relief doors are quite conventional and may have any configuration from rectangular, as shown, or circular or any other configuration as required for the specific location in the intended nacelle.

However, critical to the proper operation of conventional pressure relief doors is maintaining the original configuration of that primary lap-joint seal 46 without compromising the conventional pressure release function of the door.

Accordingly, in order to retain pristine that primary lap-joint seal 46 described above, the improved pressure relief assembly 24 introduces a specially configured fireproof secondary seal 48 initially shown in exploded view in FIGS. 3 and 4.

The secondary seal 48 preferentially bridges the door inner surface 40 and the door frame 32 around the inner perimeter of the primary seal 46 to pre-seal or block flow to the primary seal 46, without changing the design of the primary seal itself. The secondary seal 48 is generally rectangular to provide a full-perimeter seal protecting the primary seal 46, but requires special configurations to do so based on the specific design of the PRD and its mounting.

FIGS. 3 and 4 show the secondary seal 48 removed from the PRD 38, and the exemplary mounting of the door 38 to the cowl 26.

Since the door is rectangular, two conventional hinges 50 pivotally join the forward end of the door 38 to the cowl 26. And, two conventional pressure relief latches 52 (one removed for clarity in FIG. 3) latch closed the aft end of the door 38 in the stowed position. In alternate embodiments, a single hinge could be used, and a single pressure relief latch could be used, and located wherever appropriate either remote from each other, or locally together or even combined.

Any form of conventional hinged-and-latched PRD may be suitably modified under the description presented hereinbelow to incorporate a secondary seal specifically configured therefor.

Figure 12:
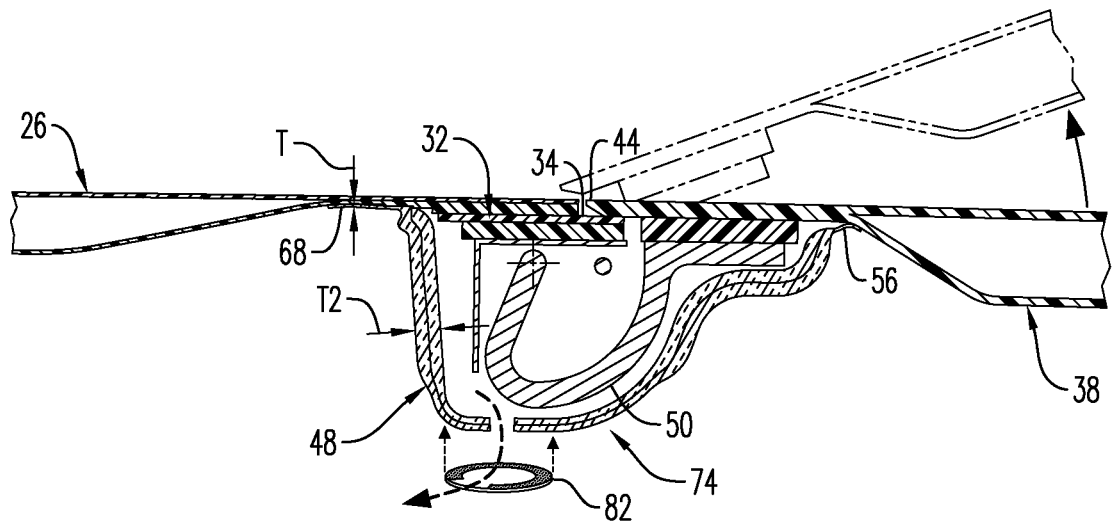
FIG. 12 is a sectional view through a mounting hinge and cover dome of the PRD shown in FIG. 6 and taken along line 12-12.

An exemplary configuration of the hinge 50 is shown in FIG. 12 and has a hook or J-shape fixedly joined to the forward end of the door 38, and an opposite end pivotally joined to the door frame 32. This is a conventional configuration, commercially available and allows the door to pivot open, yet stow closed to seat the door rim 44 around the full perimeter of the door seat 34 even at the hinge locations themselves which bridge the primary seal 46 thereat.

Figure 13:
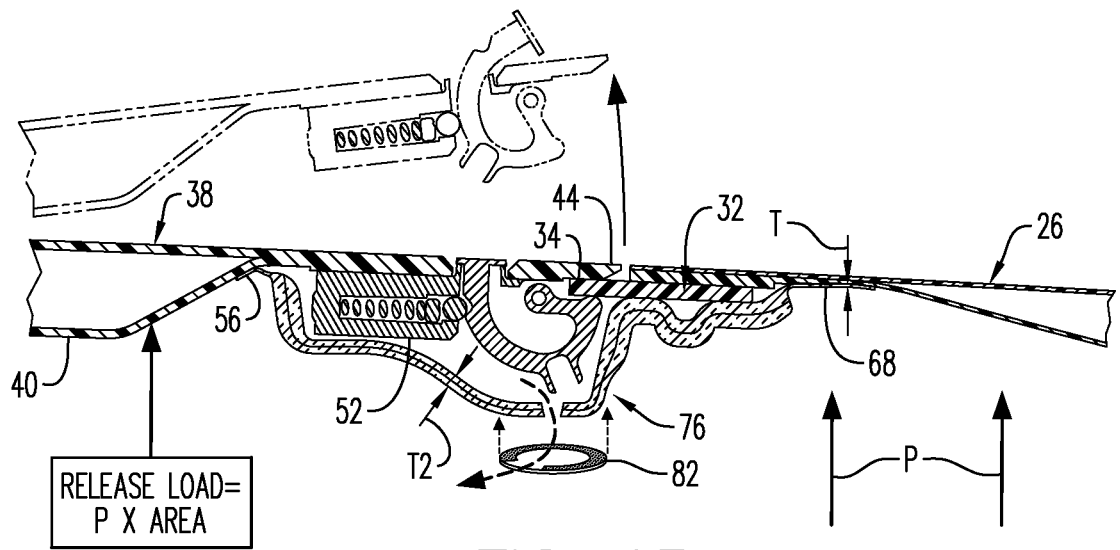
FIG. 13 is a sectional view through a retaining latch and cover dome of the PRD shown in FIG. 6 and taken along line 13-13.

An exemplary configuration of the latch 52 is shown in FIG. 13, and includes a compression spring mounted in a housing fixedly attached to the inner surface of the door 38 and having a ball detent cooperating with a J-shaped hook pivotally joined to the door near its rim 44. The pivotable hook initially bridges the door 38 to the underside of the door seat 34 in a locked closed position to effect the primary seal 46 at the aft end of the door.

In the event of pressure rise inside the cowl 26, the pressure P acts over the exposed inner surface 40 of the door 38 to create a collective pressure load which is carried or reacted through the latch 52 through the spring-loaded J-hook thereof until sufficient torque is carried through the J-hook breaking free the J-hook from the predetermined compression load acting on the spring-loaded ball-detent.

Upon reaching the release load pre-designed into the latch 52, the J-hook abruptly releases its engagement or hold on the door frame 32 and allows the door 38 to deploy open under the excess pressure and vent flow through the portal 36.

Note that this configuration and operation of the latch 52 are conventional, and any suitable commercially available pressure release latch can be used. Note also, that the latch 52 bridges the underside of the door seat 34 and allows the door to pivot open, yet stow closed to seat the door rim 44 around the full perimeter of the door seat 34 even at the latch locations themselves which bridge the primary seal 46 thereat.

The release load designed in conventional pressure release latches 52 is quite precise, and has very narrow plus and minus tolerances, which precise release loads are required for proper operation of the PRD 38 in the event of internal pressure overloads. Those internal pressure overloads can be as little as a few pounds-per-square-inch (PSI), and are critical to normal operation of the PRD 38 which requires maximum internal surface area exposed to the internal pressure.

As shown in FIGS. 3 and 4, the secondary seal 48 is configured in an annular or ring form being as narrow or as small as possible to provide pre-sealing or nested sealing around the full circumference of the primary seal 46, and has a large central opening or void allowing unobstructed pressure access to the door inner surface 40.

The latches 52 have a predetermined release load at which the latches release the door 38 to permit deployment thereof, which release load is proportional to exposed internal surface area of the door.

Correspondingly, the secondary seal 48 includes an inner perimeter terminating closely adjacent to the door frame 32 to maximize exposed surface area of the door inner surface 40 uncovered by the secondary seal 48 to in turn maximize pressure load against the door 38 for reaching the desired or predetermined release load of the latch 52.

As initially shown in FIGS. 2 and 5, the door outer surface 42 is aerodynamically smooth and disposed aerodynamically flush with the outer skin 28 of the cowl 26 in the stowed position. The door further includes a structurally thick central panel 54 with a smooth inner surface 40 from which the thinner door rim 44 extends laterally for providing a thin rim 44 fully surrounding the door central panel 54.

Figure 6:
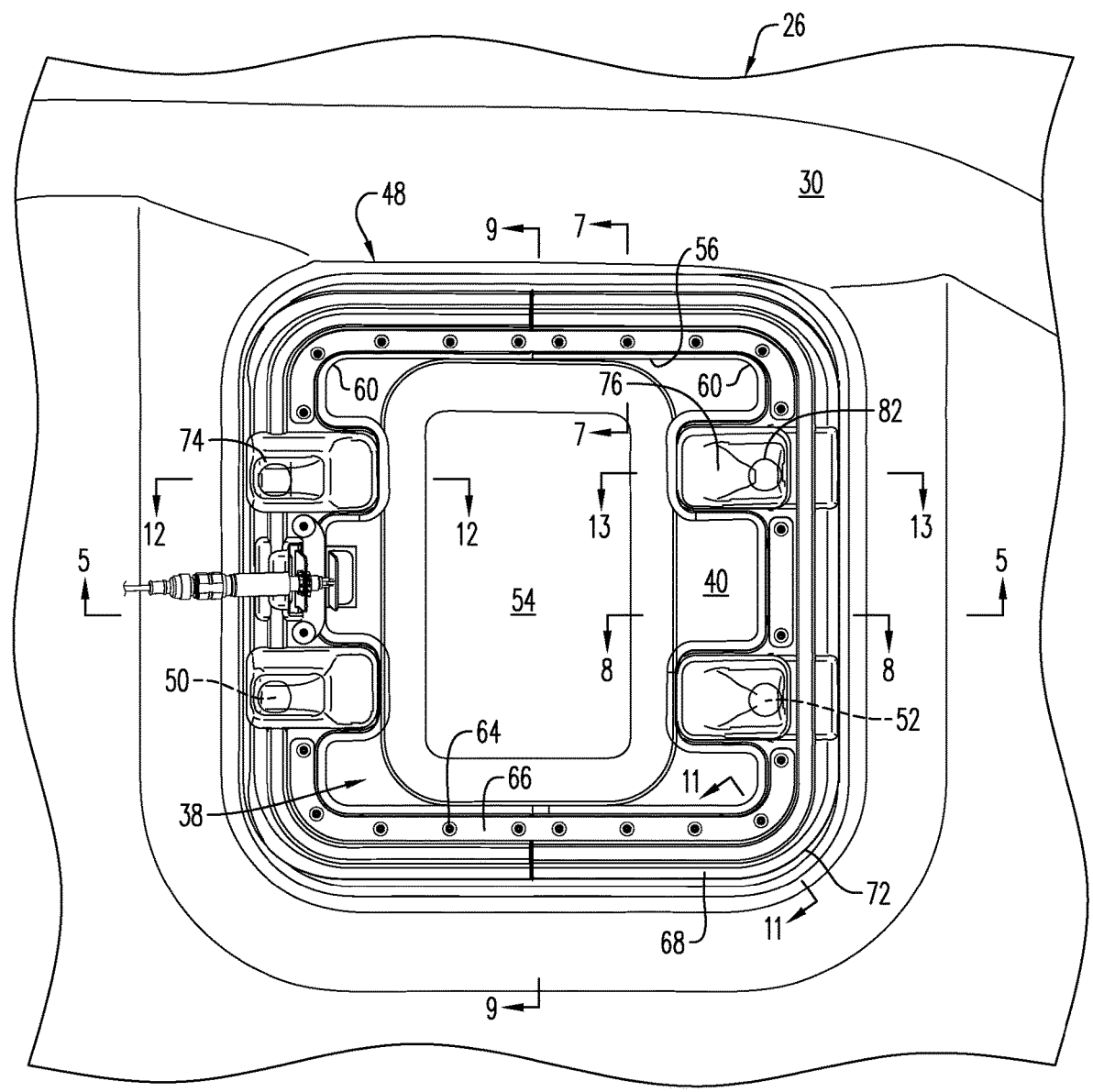
FIG. 6 is an underside view, like FIG. 3, of the PRD shown in FIG. 5 and taken along line 6-6 with the installed secondary seal.

As shown in FIGS. 3 and 6, the secondary seal 48 fully surrounds the central panel 54, and terminates outboard thereof to maximize the uncovered surface area exposed to the internal pressure.

As initially shown in FIGS. 2, 3, and 5, the door 38 blends in with the cowl 26 which both are similarly circumferentially arcuate as defined by the radius R thereof as measured from the engine centerline axis 12, or as otherwise defined for suitably similar aerodynamic profiles. The door frame 32 similarly varies in radial curvature around the circumference thereof to locally match curvature of the cowl and door.

Figure 7:
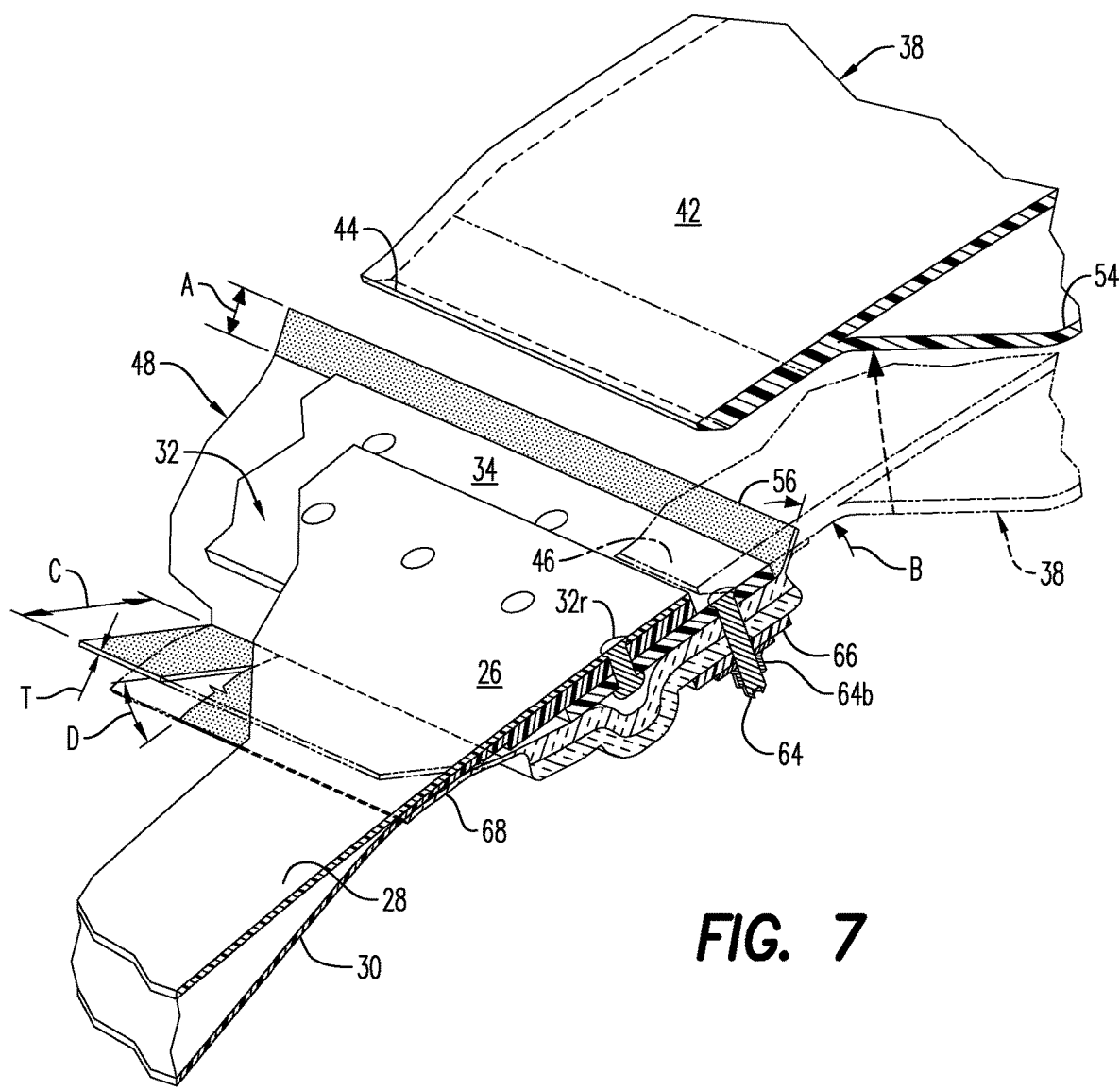
FIG. 7 is an isometric sectional view through a longitudinal leg of the PRD shown in FIG. 6 and taken along line 7-7.
Figure 8:
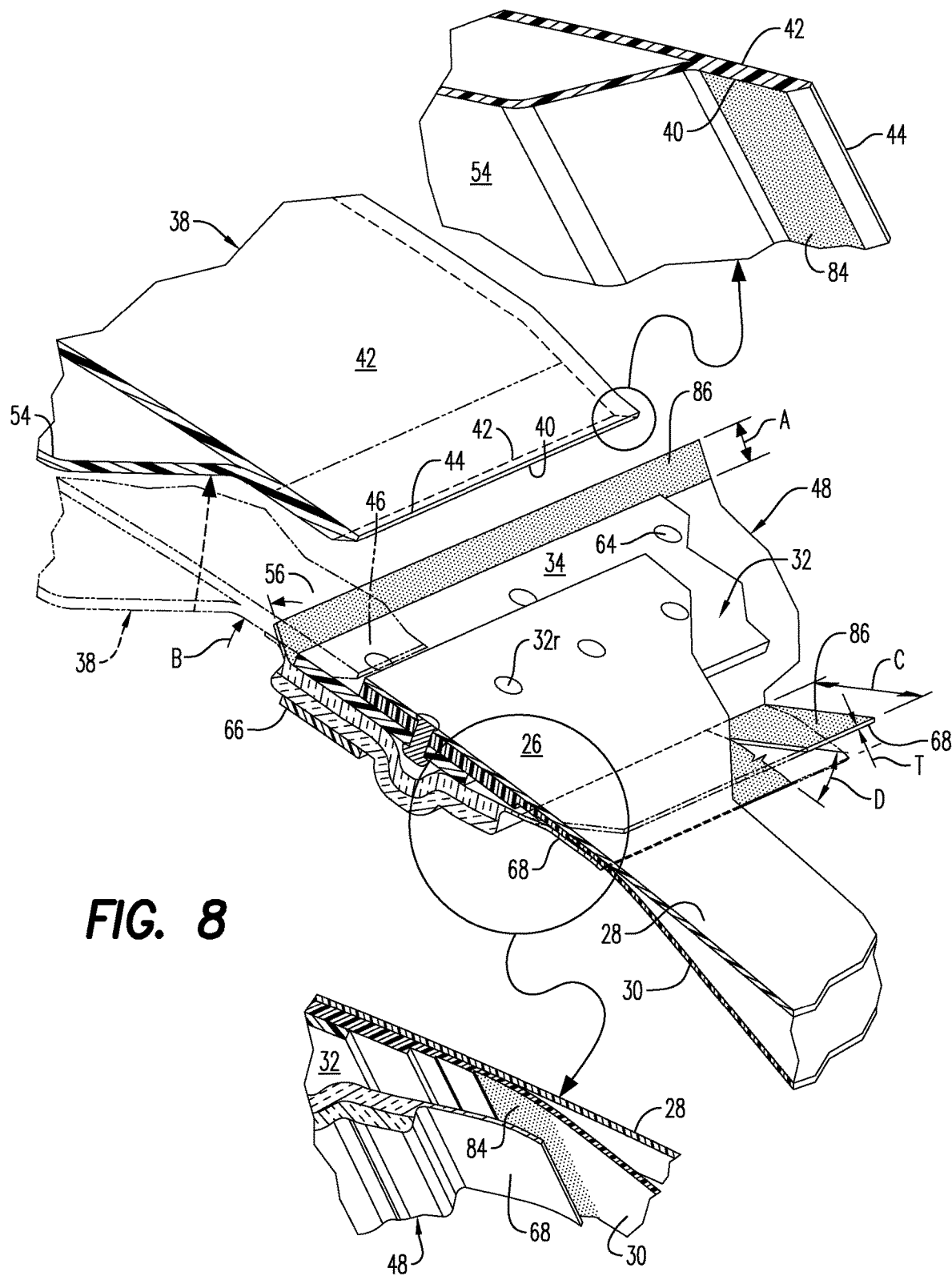
FIG. 8 is an isometric sectional view through a circumferential leg of the PRD shown in FIG. 6 and taken along line 8-8.

The secondary seal 48 is therefore specially configured to include a resilient inner sealing lip 56 extending in a cantilever laterally inwardly from the door frame 32 as shown in enlarged detail in FIGS. 7 and 8. The inner lip 56 preferably varies in flexibility around the generally rectangular inner perimeter of the secondary seal 48 for effecting an elastic compression seal directly against the inner surface of the door rim 44 to cover the inboard side of the primary seal 46, shown in part in phantom line.

As further detailed below, the inner lip 56 follows a circuitous path around the circumference of the door rim 44 and the primary seal 46 defined thereby, and is suitably configured with sufficient resiliency or elasticity to undergo elastic compression without wrinkling that would otherwise create small leakage gaps along the inner lip 56 itself. The door rim 44 and the door frame 32 vary in radial curvature around the circumference thereof, and therefore the configuration of the secondary seal 48 varies to complement that varying curvature.

Unwrinkled elastic compression of the inner lip 56 is required to ensure a lay-flat direct interference contact seal against the inner surface of the door rim 44, and thereby provide a nested seal or pre-seal with the primary seal 46 defined by the door rim 44.

Figure 9:
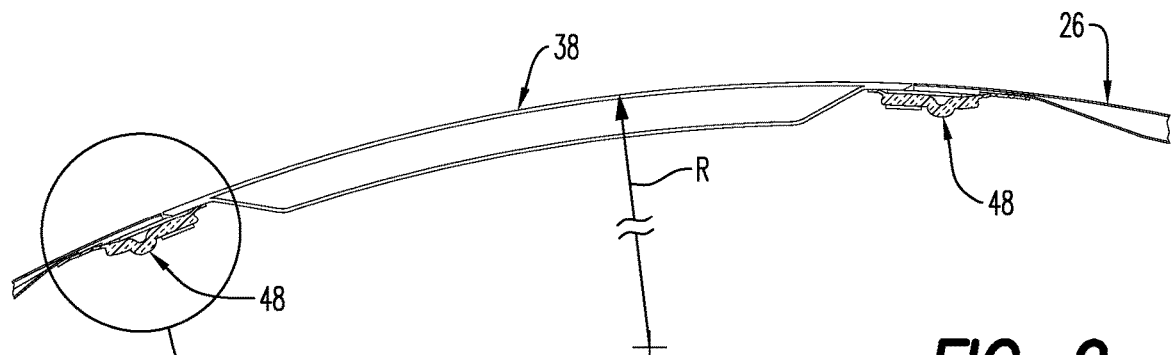
FIG. 9 is a sectional view across circumferentially opposite longitudinal legs of the PRD shown in FIG. 6 and taken along line 9-9 near the longitudinal center thereof.
Figure 9:
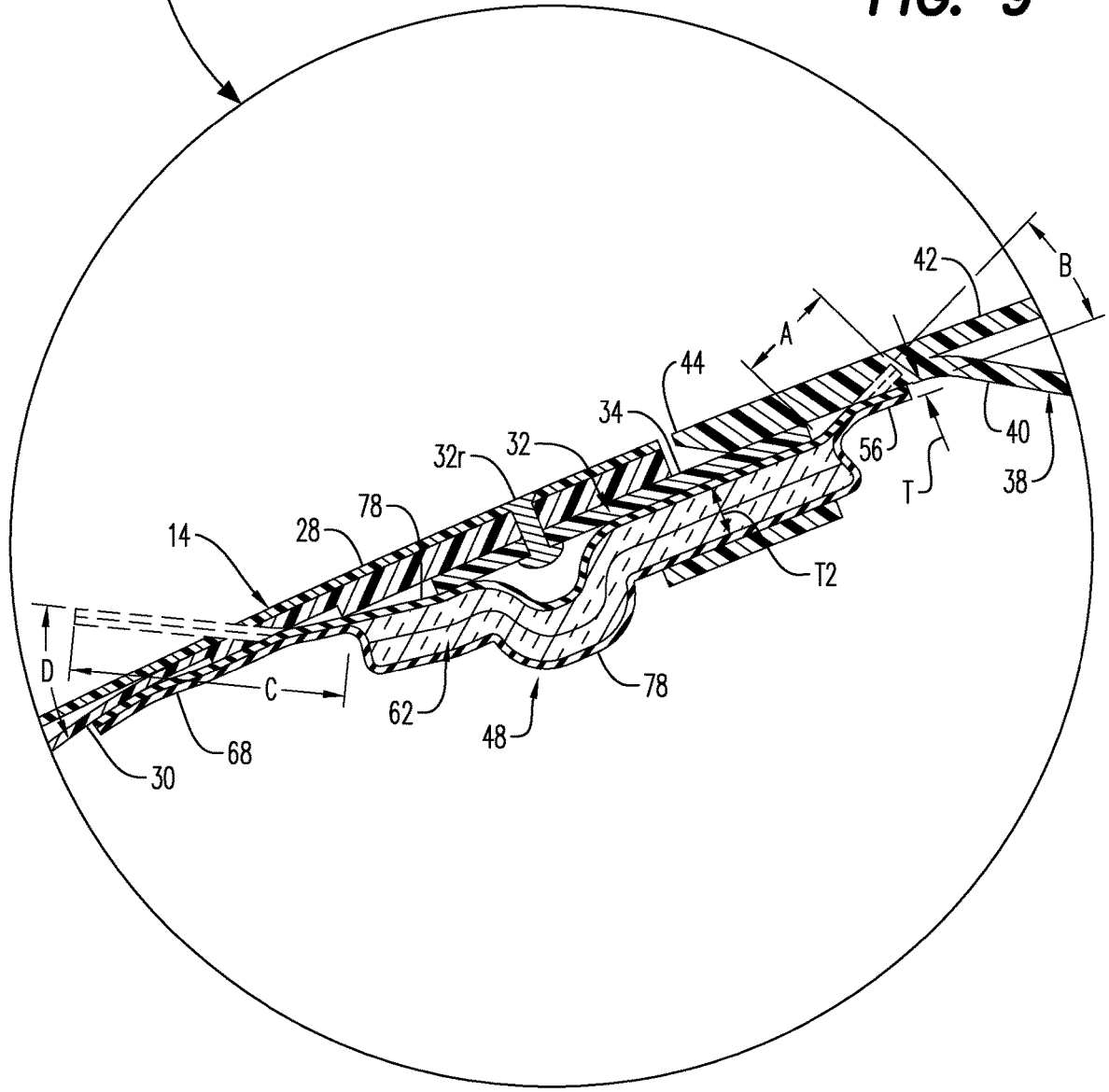

FIGS. 7 and 8 show in solid line the inner lip seal 56 in an original, undeformed configuration as manufactured, and FIG. 9 shows in solid line the inner lip seal 56 in its elastic compressed configuration in direct contact with the inner surface 40 of the door rim 44 with a compressed interference fit therewith.

The inner lip extends in suspension under the door rim 44 in a cantilever having a length A and an original undeformed acute inclination angle B preselected for being elastically compressed shallower in direct contact against the stowed door rim 44 to effect a preloaded compressive interference sealed fit therewith.

When the door 38 is deployed open, the closing or compressive force applied by the door to the inner lip is removed, and the inner lip can elastically return to its original undeformed configuration. Closing the door compresses the inner lip 56 into its sealed orientation, and the additional force required therefor is sufficiently small that it does not adversely affect the release load required to open the release latch 52 when required.

As shown in FIG. 9, the inner lip 56 is relatively thin with a thickness T, and the inclination angle B may be defined to quantify the desired interference fit between its original angular inclination and the final angular inclination in situ when compressed by the door rim 44 upon reaching the door seat 34. The in situ inclination is generally horizontal or parallel to the intended seating surface.

The material composition of the inner lip 56, its thickness T, length A, and inclination angle B all affect the elastic compressibility thereof, and any resulting elastic deformation thereof, with the length A and angle B being readily variable during development testing of different configurations.

As initially shown in FIG. 3, the door frame 32 includes longitudinally opposite forward and aft end portions or legs 32a, and circumferentially opposite side portions or legs 32b surrounding the portal 36 in a generally rectangular configuration. The forward and aft legs 32a are circumferentially arcuate to match the local curvature of the cowl and door, and the side legs 32b are generally straight longitudinally to match the longitudinal curvature of the cowl and door.

The frame legs 32a,b define narrow and thin bands in the form of a picture frame, and have four inside corners 58 which are arcuate portions of a circle extending about 90 degrees in circumference.

FIG. 3 illustrates the complex three-dimensional (3D) curvature of the door 38 for this exemplary cowl location, which curvature is particularly complex at the four inside corners 58 which transition from the arcuate forward and aft legs 32a to the longitudinal side legs 32b.

Figure 10:
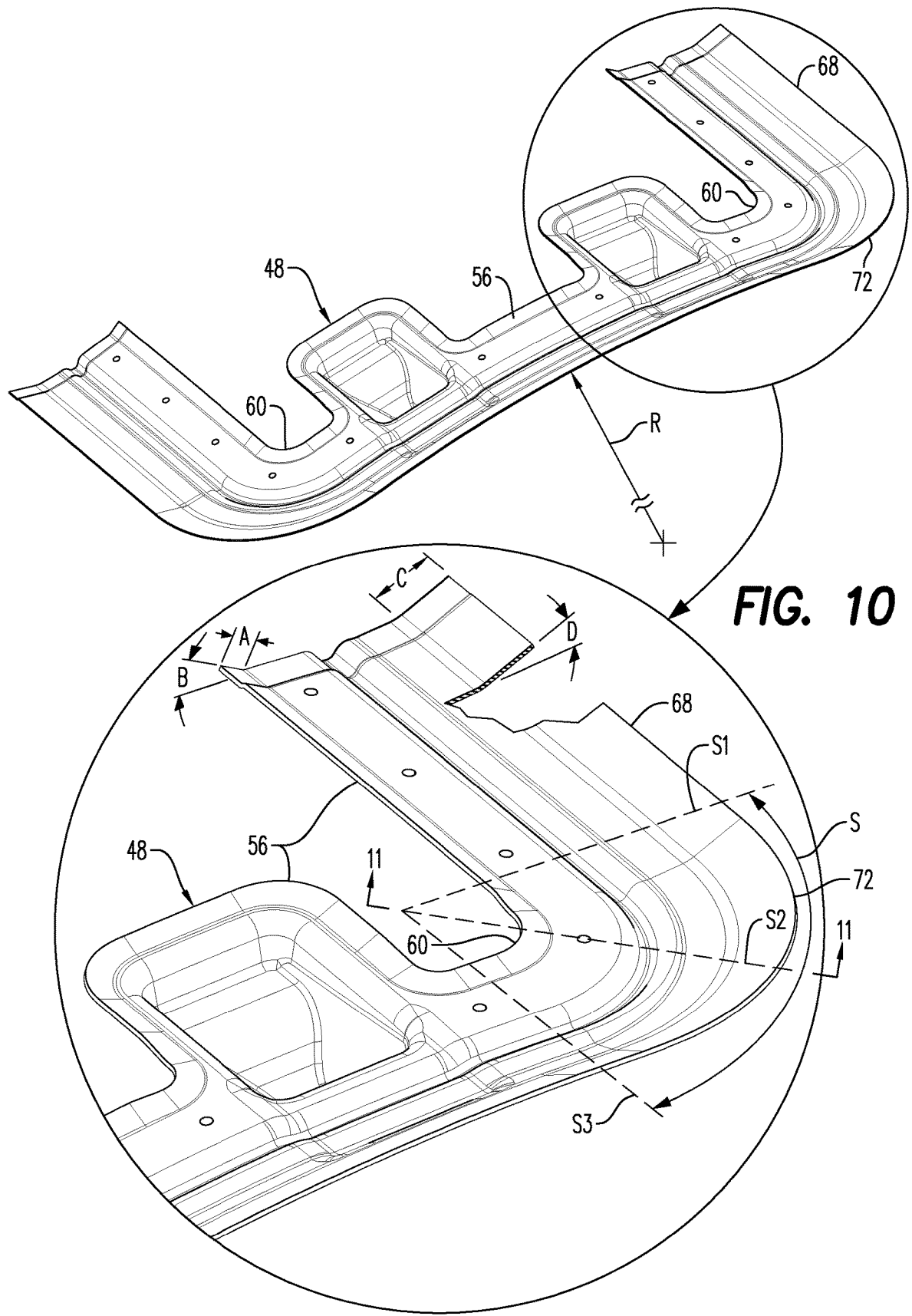
FIG. 10 is an underside isometric view of a half portion of the secondary seal shown in FIG. 3 and taken along line 10-10.

In order to provide effective sealing of the inner lip 56 at the four inside corners 58 of door frame 32, the inner lip 56 includes corresponding specially configured and complementary inside corners 60 initially shown in FIGS. 3 and 6. FIG. 10 illustrates in isolation the complex 3D curvature of the secondary seal 48, and FIG. 11 illustrates the complex curvature through an exemplary one of the four seal inside corners 60 at corresponding ones of the four frame inside corners 58.

The inclination angle B of the inner lip 56 shown in FIG. 10 can be generally constant around the perimeter of the secondary seal 48 except as required for local variations in curvature, such as the inside corners 60. At each inside corner 60, the lip inclination angle B is preferably less than nominal value of the inclination angle B outside the lip inside corner 60 to permit unwrinkled lateral contraction of the lip inside corner 60 when compressed against the door rim 44.

Figure 11:
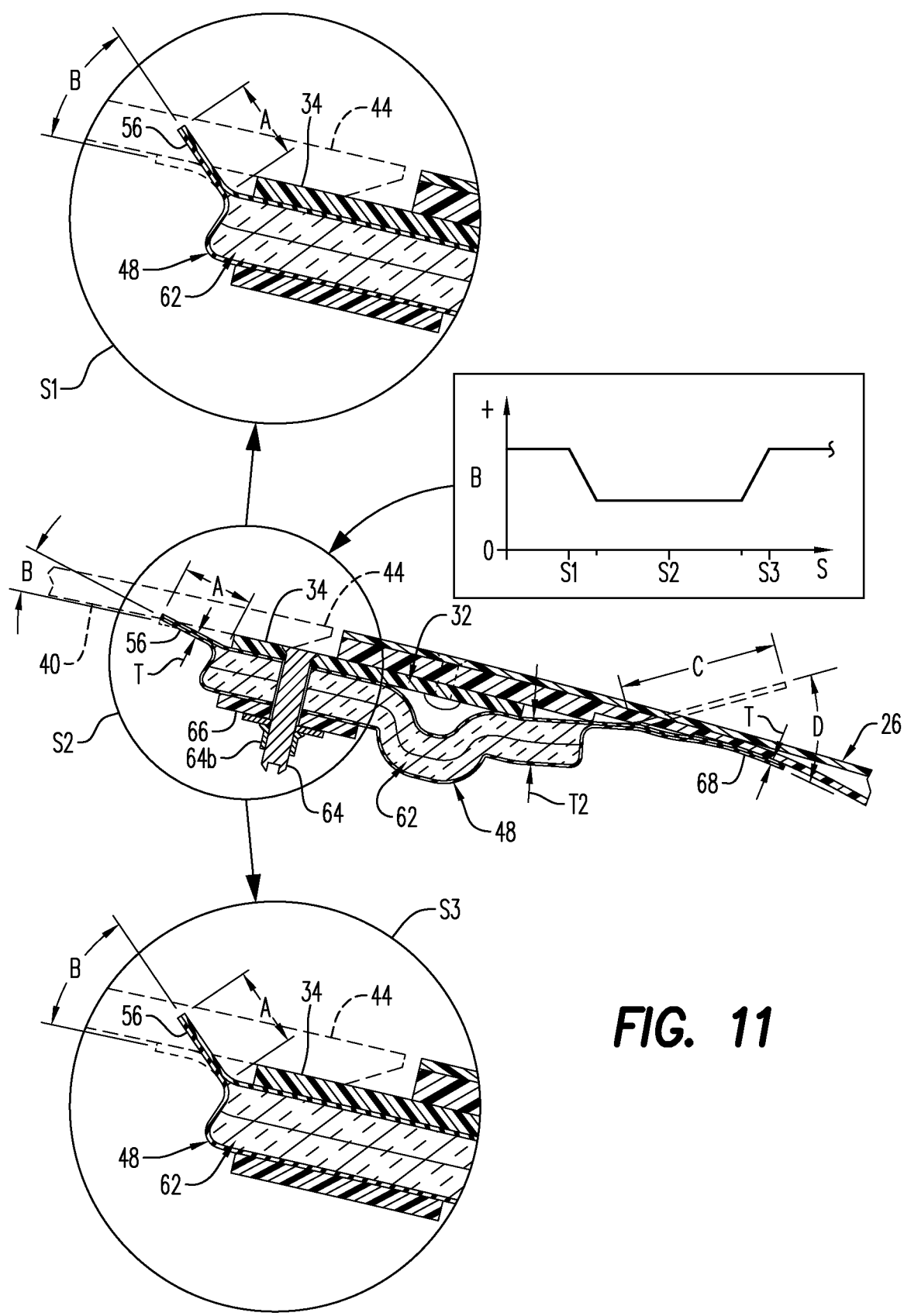
FIG. 11 is a schematic sectional view through a corner of the PRD shown in FIG. 6 and taken along line 11-11 between longitudinal and circumferential legs thereof.

In FIG. 11, two cross sections S1 and S3 of the secondary seal 48 are shown in enlarged detail immediately before and after the 90 degree range of the inside corner 60, along with a center section S2 at the 45 degree middle thereof.

The lip inclination angle B matches the nominal, large value at the outboard sections S1 and S3, which is preferentially larger than the lip inclination angle B throughout the full range of the inside corner 60, where that inclination angle B is preferably constant.

The graph in FIG. 11 illustrates the constant smaller value of the lip inclination angle B over the full 90 degree range of the inside corner 60, which inclination angle B quickly or abruptly increases over a very small section range to the larger nominal value beginning at sections S1 and S2.

This special configuration of the inside corner lip 56 was determined by testing to prevent undesirable wrinkling of the inside corner lip 56 which would otherwise cause local gaps through which flow could leak, and thereby decreasing the efficiency of the inner lip seal 56.

Note from FIG. 11 that as the door rim 44 is initially closed against its door seat 34 to create the primary seal 46 thereat, the inner lip 56 is elastically compressed until it is fully seated flat against the door inner surface 40.

The value or magnitude of the lip inclination angle B controls or determines the magnitude of the contact interference fit between the lip 56 and rim 44, with less contact interference preferred or required along the lip inside corner 60, section S2 being an example, than outboard of the lip inside corner 60, at sections S1 and S3.

Recognize that as the lip inside corner 60 is being compressed upon stowing of the door 38, not only is the inner lip 56 being cantilevered downwardly by the door rim 44, but the inner lip also experiences local circumferential contraction due to the complex 3D insider corner configuration.

If the lip inclination angle B, along with the lip length A, are too large, compression of the inner lip will wrinkle or bunch together the lip as it is compressed into a smaller collective arc and volume. This wrinkling will distort the lip and can cause undesirable gaps along the lip inside corner 60, through which flow may pass.

The preferred configuration of the inner lip seal 56 is therefore dependent on the local configuration of the door rim 44 and its door seat 34, and must be determined in various designs by further analysis or testing, or both, to ensure effective lip compression and sealing without undesirable distortion.

The secondary seal 48 is primarily configured to effect a suitable pre-seal for the primary seal 46 defined between the door rim 44 and door seat 34; yet without adversely affecting release performance of the pressure relief latch 52.

Note in this regard from FIG. 11, that the seal inner lip 56 is supported or suspended from the door frame 32, and the lip length A can be relatively small to maximize area of the door inner surface 40 subject to pressure loading.

Note also that any air pressure applied to the door inner surface 40 is also applied to the inner lip 56, which due to its flexibility can be further compressed by the air pressure to improve the lay-flat seal configuration thereof, while also transferring pressure loads through the lip 56 itself to the door rim 44, which further maximizes the pressure loads available for releasing the pressure relief latch 52.

The secondary seal 48 may be further configured to include a special fire blanket 62 referring again to FIG. 9, for example. The fire blanket 62 provides thermal insulation, and is fixedly attached to the door frame 32 by suitable fasteners 64, as shown in FIGS. 7 and 11, for example.

As best shown in FIG. 11 the fasteners 64 may comprise flush-headed bolts extending radially through the door frame 32 and fire blanket 52, with retaining nuts 64b. The fire blanket 62 preferably integrally supports the cantilever inner lip 56 in suspension upon the inner surface 40 of the door rim 44.

The fire blanket 62 is configured to provide thermal insulation for thermally protecting the underlying door frame 32 and minimizing thermal distortion of the primary seal 46 and thereby minimizing the required size of the inner lip 56. The fire blanket 62 has a suitable thickness T2 for effecting thermal insulation, while the thickness T of the inner lip 56 is substantially less than the thickness T2 of the fire blanket for their different functions in the secondary seal 48.

The seal inner lip 56 is preferably integrally cantilevered from the junction of the fire blanket 62 and the underlying door frame 32 for sealing closed the small entry junction of the primary lap seal 46, and also to reduce the inclination angle B required to provide the nested seal with the primary seal 46.

The fire blanket 62 is preferably wider than the door frame 32 and fully covers the width of the door frame to maximize thermal insulation thereof and thermally protect the primary seal 46 between the door rim 44 and door seat 34. In this way, thermal distortion of the door rim in a fire event can be minimized, which in turn minimizes the required size of the inner lip seal 56.

FIGS. 3 and 6 show a plurality of slender or narrow retainers 66 provided to fixedly clamp the secondary seal 48 to the door frame 32. The retainers 66 are aligned together around the circumference of the fire blanket 62 to fixedly clamp the blanket to the door frame 32 by the fasteners 64 extending through the door seat 34, with bolt heads being flush mounted therein, and retaining nuts disposed atop the retainers 66.

In this way, the retainers 66 compress and clamp the fire blanket 62 atop the inner surface of the door frame 32 and provide a contact seal therewith, which could be improved with a suitable sealing layer if desired. Since the inner lips 56 are integrally formed with the fire blanket 62, a continuous seal is effected therewith.

FIGS. 12 and 13 show that the exemplary hinge 50 bridges the cowl 26 and the door 38 at the forward end thereof, and the exemplary latch 52 bridges the cowl 26 and the door 38 at an aft end thereof. The primary seal 46 between the door rim 44 and the door seat 34 is therefore locally hidden below the hinges and latches.

Accordingly, the seal inner lip 56 locally detours around both the hinges 50 and the latches 52 as shown in FIGS. 3 and 6 to maintain full coverage of the inner lip seal 56 around the perimeter of the door 38.

Correspondingly, the secondary seal 48 is preferably configured to further include a flexible outer lip 68 along the entire outer perimeter thereof as initially shown in FIGS. 3 and 6.

As shown in FIGS. 7, 8, and 9 the outer lip seal 68 extends in cantilever laterally outwardly from the door frame 32 for effecting an interference compression contact seal against the cowl inner skin 30 to seal against leakage flow through the hinges 50 and the latches 52 themselves.

The outer lip seal 68 is similar in construction and operation to the inner lip seal 56 at opposite inboard and outboard lateral ends of the fire blanket 62 for correspondingly sealing both lateral edges of the secondary seal 48 in a preferred embodiment.

The outer lip 68 cantilevers in length C from the outboard edge of the door frame 32, and has an original or undeformed acute inclination angle D preselected for being elastically compressed shallower in direct contact against the cowl inner skin 30 to effect a preloaded compressive interference sealed fit therewith.

Unlike the inner lip 56 which disengages with the door 38 when the door is deployed open, the outer lip 68 remains in continuous contact with the cowl inner surface 30 when the door is stowed and deployed since the cowl 26 remains stationary relative to the door frame 32 from which the door 32 is deployed.

As indicated above with respect to FIG. 3, the door frame 32 has forward and aft arcuate legs 32a and circumferentially opposite longitudinal legs 32b surrounding the portal 36 in a generally rectangular configuration resulting in four outside corners 70 between adjoining legs. Correspondingly, the outer lip 68 includes four complementary outside corners 72.

FIGS. 3 and 10 yet again show the complex 3D curvature of the secondary seal 48 required for matching the complex 3D curvature of the door 38 seated inside the annular cowl 26. The cowl 26 has the circumferential radius R, or similar aerodynamic profile, matched by the local curvature of the door frame 32 and its arcuate legs 32a, and the frame side legs 32b extend longitudinally between the arcuate legs 32a with suitable inclination.

For the complex 3D outside corners 72, the lip length C and the lip inclination angle D of the outer lip 68 are preselected to permit elastic expansion of the outer lip 68 upon compression against the cowl inner skin 30. Note that the circumferential or arc length of the outside lip corner 72 is substantially greater than the arc length of the inside lip corner 56, and therefore the two lips 56,68 behave differently in forming the respective contact interference seals against the door rim 44 and the cowl inner skin 30, respectively.

Both inner and outer lip seals 56,68 behave similarly in being elastically compressed shallower in direct contact with their respective seats to effect the desired compression interference sealed fit therewith.

However, the length A and original inclination angle B for the inner lip 56 are additionally preselected to prevent wrinkling of the inner lip as it experiences contraction forces along the small circumferential arc length shown in FIG. 10 while effecting the lay-flat contact interference seal.

In contrast, the length C and original inclination angle D for the outer lip 56 are differently preselected to allow elastic expansion along the much larger circumferential arc length shown in FIG. 10 while effecting the lay-flat contact interference seal.

In embodiments built and tested during development, the cantilever length C of the outer lip 68 is preferably greater than the cantilever length A of the inner lip 56, and the inclination angle D of the outer lip 68 is preferably greater than the inclination angle B of the inner lip 56.

And also in preferred embodiments, the length C and original inclination D of the outer lip 68 may remain uniform around the full perimeter of the secondary seal 48, including at the four outside corners 72.

In contrast, the length A and original inclination angle B of the inner lip 68 may remain uniform around the inner perimeter of the secondary seal 48, except at the local inside corners 60 described above, where both length A and angle B are preferentially reduced to prevent lip wrinkling.

As initially shown in FIGS. 3 and 6, the secondary seal 48 may further include two hinge domes 74 which cover the two hinges 50 and extend laterally between the inner and outer lips 56,68. And, two latch domes 76 may also be provided to cover the two latches 52 and also extend laterally between the inner and outer lips 56,68.

The hinge and latch domes 74,76 are preferably molded to shape, and configured to closely cover the hinges and latches with minimal size or volume, while allowing the hinges and latches to function normally.

In this way, uncovered surface area around the central door panel 54 is maximized for maximizing pressure loads thereon during a bleed air event to retain normal operation of the pressure relief latches 52.

As indicated above, internal pressure will also be applied to the inner lip 56 and carried to the door inner surface by direct contact of the inner lip 56. Similarly, internal pressure will also be applied to the four domes 74,76 and yet again be carried in large part to the inner surface of the door in accordance with the relative surface area of these domes below the door. And, internal pressure will also be applied to the outer lip 68 and carried by the cowl inner skin 30.

The narrow retainers 66 fixedly clamp the secondary seal 48 to the door frame 32 along the rectangular door seat 34 using the flush-head bolts 64 along the seat. Four exemplary retainers 66 terminate on opposite sides of the hinge and latch domes 74,76. Two long retainers 66 extend along the longitudinal legs 32a of the door frame and follow the inside corners 70 of the frame. Two short retainers 66 extend along the circumferential legs 32b of the door frame between the two hinge domes 74 at the forward end and between the two latch domes 76 at the aft end of the door.

The line of retainers 66 is therefore interrupted in continuity around the circumference of the secondary seal 48 by the locally large hinge and latch domes 74,76, which results in the local detours of the inner lip 56 inboard of the four domes 74,76. These detours introduce eight more of the inside corners 60, and like the original four inside corners 60 match the lip configuration thereof in locally smaller cantilever length A and locally smaller inclination angle B to effect the unwrinkled compression thereof when seated against the door inner surface 40.

The four domes 74,76 also introduce eight local outside corners along the inner lip 56 which may have the same lip length A and undeformed inclination angle B as the nominal values for the inner lip 56 outside of the inside corners 60.

As shown in FIGS. 12 and 13, the fire blanket 62 extends laterally between the inner and outer lips 56,68, and also along and through the two hinge domes 74 and the two latch domes 76. As indicated above, the fire blanket 62 is substantially thicker (T2>T) than the inner and outer lips 56,68 for thermally protecting the hinges 50, the latches 52, and the underlying door frame 32, while allowing unrestrained elastic compression of the inner and outer lips 56,68 cantilevered from opposite inboard and outboard sides thereof.

As shown in enlarged view in FIG. 9, the fire blanket 62 comprises suitable thermal insulation for thermally protecting the door frame 32, hinges 50, and latches 52, and minimizing thermal distortion of the primary seal 46.

In the exemplary embodiment illustrated in FIG. 9, the fire blanket 62 is made from two or more plies of ceramic insulating paper or fabric; and the inner and outer lips 56,68 are in the form of a fabric bag 78 encapsulating the thermal insulation plies. The bag 78 is preferably a single ply of silicone impregnated fiberglass having fireproof ability, and the bag extends laterally away from the middle fire blanket 62 in thin cantilevers that define the respective inner and outer lips 56,68 in two bonded plies collectively having the thickness T. The several retainers 66 may be made from suitable carbon and epoxy composite and have inherent fireproof performance.

Figure 14:
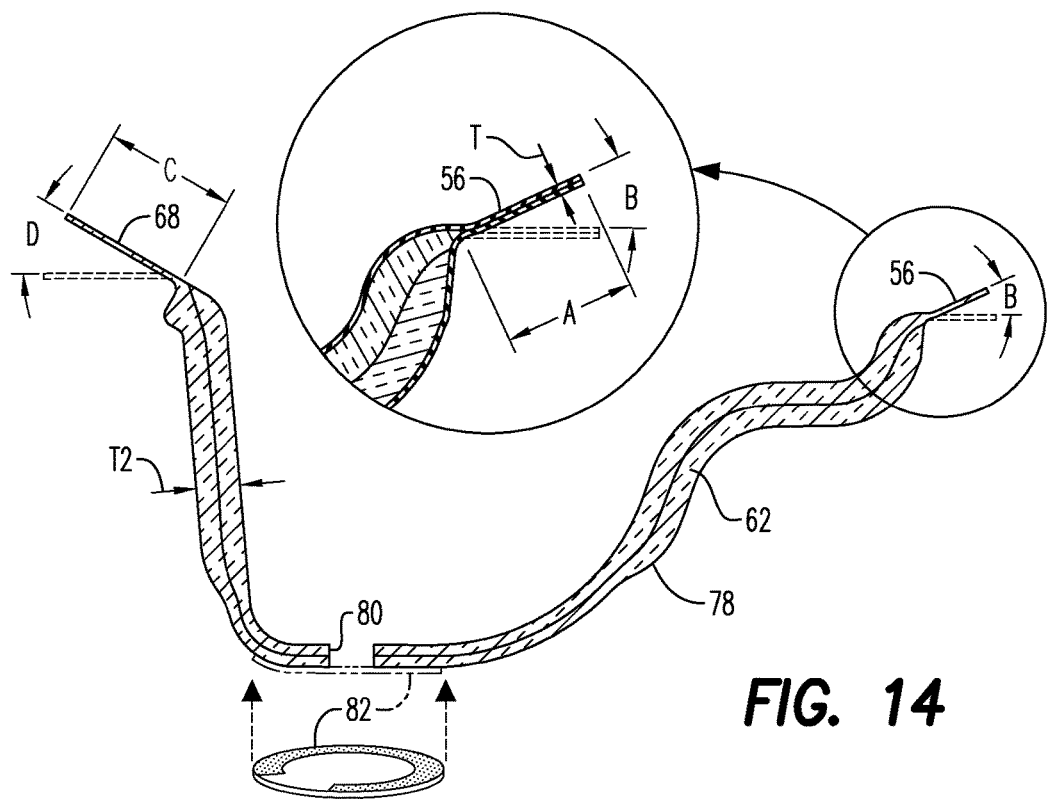
FIG. 14 is an exploded sectional view of the hinge dome shown in FIG. 12.
Figure 15:
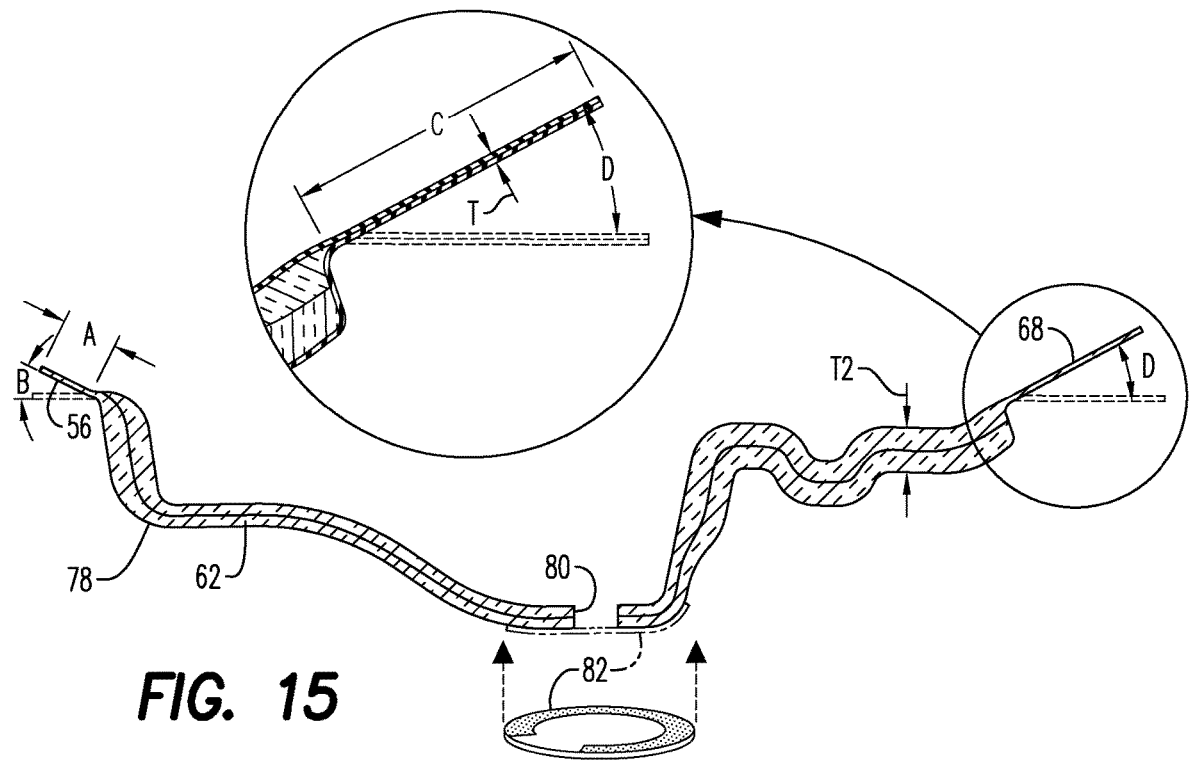
FIG. 15 is an exploded sectional view of the latch dome shown in FIG. 13.

FIGS. 14 and 15 show the hinge and latch domes 74,76 in exemplary configurations, including the central fire blanket 62 encapsulated by the one-ply bag 78, from which extend from opposite ends the two-ply inner and outer lips 56,68.

The entire secondary seal 48 can be suitably manufactured by conventional molding using conventional techniques and conventional materials to achieve the desired fireproof performance thereof, including ceramic thermal insulation in the central fire blanket 62 encapsulated in the silicone impregnated fiberglass bag 78 integrally forming the two flexible cantilever seals 56,68 at the opposite ends of the fire blanket.

FIGS. 6 and 10 show that the secondary seal 48 may be molded in two U-shaped halves, and suitably bonded or joined together at the common split lines at the middle of the two longitudinal legs thereof.

The one-ply bag 78 may have a nominal thickness of about 15 mils (0.38 mm), with the inner and outer lips 56,68 being two-ply with a total thickness T of about 30 mils (0.76 mm).

The length A of the shorter inner lip 56 may range from about 6 mm to 13 mm; and the length C of the longer outer lip 68 may range from about 19 mm to 23 mm, which is about two to three times longer than the inner lip 56.

The inclination angle B for the inner lip 56 is nominally about 25 degrees along the entire perimeter except for the four plus eight inside corners 60 described above, which have the smaller inclination angle B of about 15 degrees. The inclination angle D for the outer lip 68 is about 30 degrees around the entire perimeter, including the four outside corners 72.

The numerical dimensions or measurements listed above or otherwise defining the geometry and material composition of the secondary seal 48 are merely exemplary for use in the exemplary embodiment of the PRD 24 described herein, and other embodiments of a pressure relief door and cooperating secondary fireproof seal may have suitably different material compositions and configuration and dimensions and features as required for the specific aircraft engine application.

The cantilever lengths A,C and original inclination angles B,D of the respective sealing lips 56,68 can be readily molded into the original design as required for the in situ application of specifically designed pressure relief doors.

The thickness T2 of the fire blanket 62 is generally constant around the circumference of the secondary seal 48, but may vary as required, especially over the hinge and latch domes 74,76 which are differently configured for the different shapes of the hinges 50 and latches 52.

As shown in FIGS. 14 and 15 the hinge and latch domes 74,76 include respective drain holes 80 in the bottoms thereof where gravity can trap liquid. The drain holes 80 are covered by corresponding flexible sealing patches 82 bonded to the domes with a local interruption of the bond to seal the drain holes 80 under applied air pressure during engine operation, and to permit liquid draining when unpressurized.

Any suitable sealing patch 82 may be used in the exemplary form of conventional flapper valves or reed valves or other form for maintaining sealing of the respective domes when required, while also allowing venting or draining of any trapped liquid during operation.

The patches 82 may be made of fiberglass reinforced silicon, for example, and bonded around most, but not all, of the perimeter thereof by a suitable adhesive, such as silicone resin or suitable room temperature vulcanizing (RTV) material.

The cowl 26, door 38, and door frame 32 may be formed of any conventional materials for use in an aircraft, and can meet any required fireproof capabilities. In the exemplary embodiment illustrated, these parts comprise fiber-reinforced composite materials molded to shape, such as carbon fibers in an epoxy matrix.

The fiber configuration may result in rough exposed surfaces, characterized as an orange peel surface, and the silicone-impregnated inner and outer lips 56,68 may provide effective sealing therewith.

FIGS. 7 and 8 illustrate exemplary rough, orange-peel textures 84 for the inner surface 40 of the door rim 44 and for the inner skin 30 of the cowl 26. In this configuration, the outer lip 68 may be adhesively bonded to the rough cowl inner skin 30 using a suitable room temperature vulcanizing (RTV) silicone 86 applied in a thin layer therebetween.

Correspondingly, the inner lip 56 may include a seal coat 88 bonded thereto and conforming in texture with the rough door rim 44 to improve sealing effectiveness of the inner lip 56 in interference contact with the rough door rim.

The same RTV silicone 86 may be used for the seal coat 88 and can be pre-applied to the door rim 44 in uncured form, and using the compression load of the inner lip 56 to press thin the uncured silicone against the door seat 34, pre-applied with a suitable release agent preventing bonding of the silicone thereto.

Upon curing of the seal coat 88, it will be fixedly bonded to the door rim 44 to identically match the texture of the door seat 34, and the release agent can be cleaned therefrom.

FIGS. 3, 4, and 5 illustrate a conventional plunger switch 90 for monitoring position of the door 38, which switch cooperates with a pair of brackets 92 to mount the switch and activate the plunger when the door is deployed. The secondary seal 48 may therefore include local interruptions or slits through which the brackets 92 may extend, with the slits being suitably sealed by RTV silicone, for example.

Other features may be found in the door 38 for which additional modifications of the secondary seal 48 may be made to ensure full sealing capability thereof.

Accordingly, the improved pressure relief assembly 24 described above can maintain original configuration and operation of the PRD 38, including operation of the primary lap-joint seal 46 and pressure release performance of the two latches 52, while retaining maximum pressure loading over the inner surface of the door.

The specially configured secondary seal 48 may then be separately manufactured for in situ assembly with the otherwise conventional PRD 38, which assembly requires minor modifications to the PRD 38 for mounting the secondary seal 48 thereon using the retainers 66 and fasteners 64.

The secondary seal 48 provides both fireproof protection for the PRD 38 and nested, pre-sealing of the primary seal 46, which protects the PRD 38 in a fire event to ensure sealing redundancy by the primary seal 46 and the secondary seal 48, as well as minimizing thermal distortion of the PRD 38 which might otherwise cause gaps and venting through the primary seal 46.

As indicated above, various features of the secondary seal 48 may be used separately or in combination based on the particular design of the PRD and the hinge and latching thereof. Use of the inner lip seal 56 may be supplemented or not by adding the integral fire blanket 62, which may further be supplemented or not by adding the outer lip seal 68.

The new design seal allows the pressure relief door to perform its pressure relief function and also meet the fireproof requirements by allowing the door to rest solidly on the door land and creating a fire seal in a special manner.

The new seal allows the door to hit the land directly and continue to control the load on the latches like a traditional pressure relief door but a fire barrier is created by the seal creating the interference with the door using the stiffness and geometry of the seal itself without unduly affecting the pressure relief door latch loads. The new secondary seal and the method in which it interfaces with the pressure relief door provide substantial fireproofing benefits while retaining PRD venting performance.

The seal design with its solid center and flexible lips or fingers creates the contact interference seal with the door and fire seal thereat.

The seal interface with door and door land is shaped to nominally interfere with the door and the land and create the contact fire seal and barrier.

The seal attachment to the door frame or land does not interfere with the PRD release and venting functions.

Positive pressure inside the nacelle cavity and negative pressure outside the cavity during engine operation create a pressure seal and provide better seal closure.

The drains and sealing patches in the dome covers over the latches and the hinges allow liquids to drain out while on the ground and un-pressurized, and then re-seal to minimize pressure leakage during flight.

Accordingly, various features of the secondary seal disclosed about may be used singly or in combination depending on the configuration of the particular pressure relief door and its hinge-and-latch mounting, and may be suitably modified as required to effect a new fire barrier at the entrance of the primary seal along its entire perimeter, or along portions thereof as warranted.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A pressure relief assembly (24) comprising:
    an aircraft engine cowl (26) including radially outer and inner skins (28,30) having an opening therethrough;
    a door frame (32) fixedly joined around the perimeter of said opening and extending laterally therefrom to define a door seat (34) surrounding a central portal (36) and facing radially outwardly;
    a pressure relief door (38) pivotally joined to said cowl (26) for being deployed outwardly from a stowed closed position covering said portal (36) to a deployed open position uncovering said portal (36);
    said door (38) having radially opposite inner and outer surfaces (40,42) terminating in a perimeter rim (44), with said inner surface of said rim (44) overlapping said door seat (34) to define a primary seal (46) in said door stowed position; and
    a fireproof secondary seal (48) bridging said door inner surface (40) and said frame (32) around the inner perimeter of said primary seal (46) to pre-seal flow to said primary seal (46).

2. An assembly according to claim 1 further comprising:
    a hinge (50) pivotally joining said door (38) to said cowl (26);
    a pressure relief latch (52) latching closed said door (38) in said stowed position and having a predetermined release load at which said latch (52) releases said door (38) to permit deployment thereof;
    said door seat (34) and said door rim (44) being in direct contact to define a sealed lap joint thereat; and
    said secondary seal (48) including an inner perimeter terminating closely adjacent to said door frame (32) to maximize surface area of said door inner surface (40) uncovered by said secondary seal (48) to in turn maximize pressure load against said door (38) for reaching said predetermined release load of said latch (52).

3. An assembly according to claim 2 wherein:
said door outer surface (42) is aerodynamically smooth and disposed aerodynamically flush with said cowl outer skin (28) in said stowed position;
said door (38) further includes a structurally thick central panel (54) from which said door rim (44) extends laterally for providing a thin rim (44) surrounding said door central panel (54); and
said secondary seal (48) terminates outboard of said central panel (54) to maximize said uncovered surface area.

4. An assembly according to claim 3 wherein:
said cowl (26) and door (38) are circumferentially arcuate, and said door frame (32) varies in curvature around the circumference thereof to locally match said cowl (26) and door (38); and
said secondary seal (48) includes an inner sealing lip (56) extending in a cantilever laterally inwardly from said door frame (32) and varying in flexibility around said inner perimeter thereof for effecting an unwrinkled compression seal against said door rim (44).

5. An assembly according to claim 4 wherein:
said cantilever inner lip (56) has a length (A) and an original inclination angle (B) preselected for being elastically compressed shallower in direct contact against said stowed door rim (44) to effect a preloaded compressive interference sealed fit therewith.

6. An assembly according to claim 4 wherein:
said door frame (32) includes forward and aft circumferentially arcuate legs (32a) and circumferentially opposite longitudinal legs (32b) surrounding said portal (36) and having an inside corner (58); and
said inner lip (56) includes a complementary inside corner (60) having an inclination angle (B) less than the inclination angle (B) outside said lip inside corner (60) to permit unwrinkled lateral contraction of said lip inside corner (60) when compressed against said door rim (44).

7. An assembly according to claim 6 wherein said inner lip inclination angle (B) is constant along said lip inside corner (60).

8. An assembly according to claim 4 wherein said secondary seal (48) further comprises a fire blanket (62) fixedly attached to said door frame (32) and integrally supporting said cantilever inner lip (56) in suspension upon said door rim (44).

9. An assembly according to claim 8 wherein said fire blanket (62) comprises thermal insulation for thermally protecting said door frame (32) and minimizing thermal distortion of said primary seal (46) and thereby minimizing size of said inner lip (56), with said inner lip (56) having a thickness (T) substantially less than the thickness (T2) of said fire blanket (62).

10. An assembly according to claim 8 further comprising a narrow retainer (66) fixedly clamping said fire blanket (62) to said door frame (32) by a plurality of fasteners (64) extending through said door seat (34).

11. An assembly according to claim 4 wherein:
said hinge (50) bridges said cowl (26) and said door (38) at a forward end thereof, and said latch (52) bridges said cowl (26) and said door (38) at an aft end thereof;
said seal inner lip (56) detours around both said hinge (50) and said latch (52); and
said secondary seal (48) further includes a flexible outer lip (68) along the outer perimeter thereof extending in cantilever laterally outwardly from said door frame (32) for effecting a compression contact seal against said cowl inner skin (30) to seal leakage flow through said hinge (50) and said latch (52).

12. An assembly according to claim 11 wherein said cantilever outer lip (68) has a length (C) and an original inclination angle (D) preselected for being elastically compressed shallower in contact against said cowl inner skin (30) to effect a preloaded compressive interference sealed fit therewith.

13. An assembly according to claim 12 wherein:
said door frame (32) includes forward and aft circumferentially arcuate legs (32a) and circumferentially opposite longitudinal legs (32b) surrounding said portal (36) and having an outside corner (70); and
said outer lip (68) includes a complementary outside corner (72) having a corresponding length (C) and inclination angle (D) preselected to permit elastic expansion of said outer lip (68) upon compression against said cowl inner skin (30).

14. An assembly according to claim 12 wherein:
said cantilever inner lip (56) includes a length (A) and an original inclination angle (B) for being elastically compressed shallower in direct contact against said stowed door rim (44) to effect a preloaded compression interference sealed fit therewith; and
said length (C) of said outer lip is greater than said length (A) of said inner lip (56), and said inclination angle (D) of said outer lip is greater than said inclination angle (B) of said inner lip (56).

15. An assembly according to claim 12 wherein said secondary seal (48) further includes:
a hinge dome (74) covering said hinge (50) and extending laterally between said inner and outer lips (56,68);
a latch dome (76) covering said latch (52) and extending laterally between said inner and outer lips (56,68); and
a plurality of narrow retainers (66) fixedly clamping said secondary seal (48) to said door frame (32) and terminating on opposite sides of said hinge and latch domes (74,76).

16. An assembly according to claim 15 wherein said secondary seal (48) further comprises a fire blanket (62) extending laterally between said inner and outer lips (56,68) and along said hinge and latch domes (74,76), with said fire blanket (62) being substantially thicker (T2>T) than said inner and outer lips (56,68) for thermally protecting said hinge (50), latch (52), and door frame (32), while allowing unrestrained elastic compression of said inner and outer lips (56,68) cantilevered therefrom.

17. An assembly according to claim 16 wherein:
said fire blanket (62) comprises thermal insulation for thermally protecting said door frame (32), hinge (50), and latch (52), and minimizing thermal distortion of said primary seal (46); and
said inner and outer lips (56,68) comprise a fabric bag (78) encapsulating said thermal insulation (62), and extending laterally therefrom in thin cantilevers.

18. An assembly according to claim 17 wherein said fabric bag (78) comprises a single ply encapsulating said thermal insulation (62) and joining together in two plies to define said inner and outer lips (56,68) at opposite ends of said fire blanket (62).

19. An assembly according to claim 15 wherein both said hinge and latch domes (74,76) include a drain hole (80) covered by a corresponding flexible sealing patch (82) bonded to said domes (74,76) with a local interruption of said bond to seal said drain holes (80) under applied pressure and to permit liquid draining when unpressurized.

20. An assembly according to claim 15 wherein:
- said cowl (26) and door (38) comprise fiber-reinforced composite materials molded to shape and having rough exposed surfaces (84);
- said outer lip (68) is adhesively bonded to said rough cowl inner skin (30); and
- said inner lip (56) includes a seal coat (88) conforming in texture with said rough door rim (44) to improve sealing effectiveness of said inner lip (56) in interference contact with said rough door rim (44).

\* \* \* \* \*